(12) United States Patent
Kawakami et al.

(10) Patent No.: US 11,212,569 B2
(45) Date of Patent: Dec. 28, 2021

(54) CONTENT DISTRIBUTION SERVER, VIRTUAL CHARACTER PROVIDING SERVER, CONTENT DISTRIBUTION SYSTEM, CONTENT DISTRIBUTION METHOD, AND PROGRAM

(71) Applicant: DWANGO Co., Ltd., Tokyo (JP)

(72) Inventors: Nobuo Kawakami, Tokyo (JP);
Kentarou Matsui, Sapporo (JP);
Shinnosuke Iwaki, Tokyo (JP);
Takashi Kojima, Tokyo (JP); Naoki Yamaguchi, Sapporo (JP)

(73) Assignee: DWANGO Co., Ltd., Tokyo (JP)

( * ) Notice: Subject to any disclaimer, the term of this patent is extended or adjusted under 35 U.S.C. 154(b) by 0 days.

(21) Appl. No.: 17/059,682

(22) PCT Filed: Jul. 11, 2019

(86) PCT No.: PCT/JP2019/027617
§ 371 (c)(1),
(2) Date: Nov. 30, 2020

(87) PCT Pub. No.: WO2020/022095
PCT Pub. Date: Jan. 30, 2020

(65) Prior Publication Data
US 2021/0211756 A1 Jul. 8, 2021

(30) Foreign Application Priority Data

Jul. 25, 2018 (JP) .............................. JP2018-139787

(51) Int. Cl.
| | | |
|---|---|---|
| *H04N 21/24* | (2011.01) | |
| *H04N 21/258* | (2011.01) | |
| *G06F 21/10* | (2013.01) | |
| *H04N 21/254* | (2011.01) | |
| *H04N 21/81* | (2011.01) | |
| *H04N 21/84* | (2011.01) | |

(52) U.S. Cl.
CPC ....... *H04N 21/25808* (2013.01); *G06F 21/10* (2013.01); *H04N 21/2407* (2013.01);
(Continued)

(58) Field of Classification Search
None
See application file for complete search history.

(56) References Cited

U.S. PATENT DOCUMENTS

| | | | | |
|---|---|---|---|---|
| 9,199,171 | B2 * | 12/2015 | Mizuki | ............... H04N 21/4312 |
| 2020/0336794 | A1 * | 10/2020 | Fels | ................ H04N 21/440236 |

FOREIGN PATENT DOCUMENTS

| | | |
|---|---|---|
| JP | 2002-271693 A | 9/2002 |
| JP | 2011-215701 A | 10/2011 |

(Continued)

OTHER PUBLICATIONS

Translation of International Search Report and Written Opinion dated Aug. 13, 2019 in corresponding application No. PCT/JP2019/027617; 18 pgs.

(Continued)

Primary Examiner — Cai Y Chen
(74) Attorney, Agent, or Firm — Maier & Maier, PLLC

(57) ABSTRACT

Provided is a content distribution server or the like capable of limiting undesirable behavior of viewers. This content distribution server 100 comprises: an information acquisition unit 141 which acquires character information indicating a virtual character used by a distributor in a virtual space, additional information added to the character information, and/or limit information set by the distributor; a distribution unit 143 which distributes live content according to an image in the virtual space in which the movement of the distributor is synthesized as the movement of the virtual character, on the basis of the character information acquired by the information acquisition unit 141; and a behavior
(Continued)

limiting unit 144 which limits the behavior of a viewer who watches the live content, on the basis of the additional information and/or the limit information set by the distributor.

12 Claims, 7 Drawing Sheets

(52) U.S. Cl.
CPC ..... *H04N 21/2541* (2013.01); *H04N 21/8146* (2013.01); *H04N 21/84* (2013.01)

(56) References Cited

FOREIGN PATENT DOCUMENTS

| | | |
|---|---|---|
| JP | 2013-37670 A | 2/2013 |
| JP | 2015-185020 A | 10/2015 |
| WO | 2008/139872 A1 | 11/2008 |

OTHER PUBLICATIONS

Mogura Inc., [online], [retrieved on Jul. 24, 2019], Apr. 21, 2018, Internet: <URL:https://www.moguravr.com/virtualcast-2/>, pp. 1-17, non-official translation (Thorough explanation! What is a "virtual cast" that anyone can become a VTuber?).

[Online], [retrieved on Jul. 24, 2019], Apr. 16, 2018, Internet: <URL:https://vrm.dev/vrm_about/>, pp. 1-6, (General Incorporated Association VRM Consortium), non-official translation (What is "VRM"? What can it do?).

Mogura Inc., [online], [retrieved on Jul. 26, 2019], Mar. 6, 2018, Internet: <URL:https://www.moguravr.com/shinonome-megu/>, pp. 1-7, (What is the secret of the cuteness of the featured virtual girl "Shinonome-megu"?).

Decision to Grant a Patent dated Jun. 25, 2019 of corresponding Japanese application No. 2018-139787; 5 pgs.

Notice of Reasons for Refusal dated Jan. 7, 2019 of corresponding Japanese application No. 2018-139787; 12 pgs.

Notice of Reasons for Refusal dated Oct. 3, 2018 of corresponding Japanese application No. 2018-139787; 6 pgs.

\* cited by examiner

FIG.6

| POSTER ID | INFORMATION ID | INFORMATION TYPE | DISTRIBUTION STATE | SIZE | ADDITIONAL INFORMATION | URL |
|---|---|---|---|---|---|---|
| tokky-s1 | 71B6A1 | CHARACTER | BEING DISTRIBUTED | 17.4MB | ADDITIONAL INFORMATION A | http://··· |
| isho674 | 1715B1 | CHARACTER | BEING DISTRIBUTED | 11.6MB | ADDITIONAL INFORMATION B | http://··· |
| 35shohy | 43A25D | CHARACTER | END OF DISTRIBUTION | 15.4MB | ADDITIONAL INFORMATION C | http://··· |
| jitu4yo | A66CE6 | OBJECT | BEING DISTRIBUTED | 4.1MB | ADDITIONAL INFORMATION D | http://··· |
| chosaK | 2B615B | OBJECT | BEING PAUSED | 6.3MB | ADDITIONAL INFORMATION E | http://··· | and

CONTENT DISTRIBUTION SERVER, VIRTUAL CHARACTER PROVIDING SERVER, CONTENT DISTRIBUTION SYSTEM, CONTENT DISTRIBUTION METHOD, AND PROGRAM

FIELD

The present disclosure relates to a content distribution server, a virtual character providing server, a content distribution system, a content distribution method, and a program.

BACKGROUND

Recently, a service for distributing a live content through a network has been widespread as Internet live broadcast. In such Internet live broadcast, a technology has been proposed in which a distributor appears as a virtual character (an avatar) in a virtual space and an image thereof is distributed as a live content. In such a live content, an image in which the motion of the distributor is synthesized as the motion of the virtual character is distributed by a motion capture technology.

For example, in Patent Document 1, a system is disclosed in which a player or an audience provided with a head mount display (HMD) participates in a game, a movie, or the like as a virtual character, and images photographed at a plurality of viewpoints are distributed through a multichannel. In addition, in Patent Document 1, it is also disclosed that a viewer viewing the distribution allows a character developed in a game device associated with the distribution to participate in the distribution.

CITATION LIST

Patent Document

Patent Document 1: JP-A-2002-271693

SUMMARY

For a provider of the virtual character (for example, an author, a copyright holder, a provision operator, or the like), the virtual character may be used or viewed by a method contrary to the intention of the provision.

In addition, each distributor participating in the distribution has a mode of thought such as a target, an object, and a policy.

For this reason, the behavior of the viewer in the distribution includes a behavior that is not desirable for the provider of the virtual character or the distributor using the virtual character. It is preferable to limit such a behavior of the viewer.

In Patent Document 1, it is only disclosed that the viewer allows the character that has been used in the game to appear in the distribution, but it is not disclosed that the undesirable behavior of the viewer is limited.

Therefore, the disclosure has been made in consideration of such circumstances described above, and an object thereof is to provide a content distribution server or the like capable of limiting an undesirable behavior of a viewer.

In order to attain the object described above, a content distribution server according to a first viewpoint of the disclosure, includes: an information acquisition unit acquiring character information indicating a virtual character to be used by a distributor in a virtual space, additional information added to the character information, and/or limit information set by the distributor; a distribution unit distributing a live content according to an image in the virtual space in which a movement of the distributor is synthesized as a movement of the virtual character, on the basis of the character information acquired by the information acquisition unit; and a behavior limiting unit limiting a behavior of a viewer viewing the live content, on the basis of the additional information and/or the limit information set by the distributor.

In order to attain the object described above, a virtual character providing server according to a second viewpoint of the disclosure, includes: an information providing unit providing character information indicating a virtual character to be used in a virtual space and additional information added to the character information to a user; and a posting accepting unit accepting a posting of the character information and the additional information, in which in the additional information, information indicating one or more of availability of commercial use, display of copyright, availability of modification, availability of redistribution, an importance of world view, an age limit, an available period, and presence or absence of a special event specification and contents thereof is included.

In addition, in order to attain the object described above, a content distribution system according to a third viewpoint of the disclosure, includes: a content distribution server distributing a live content, on the basis of an image in a virtual space in which a movement of a distributor is synthesized as a movement of a virtual character; and a virtual character providing server providing character information indicating the virtual character and additional information added to the character information, in which the content distribution server distributes the live content according to the image in the virtual space in which the movement of the distributor is synthesized as the movement of the virtual character, on the basis of the character information and the additional information that are acquired from the virtual character providing server, and/or limit information set by the distributor, and limits a behavior of a viewer viewing the live content, on the basis of the additional information and/or the limit information set by the distributor.

In addition, in order to attain the object described above, a content distribution method according to a fourth viewpoint of the disclosure, includes: an information acquisition step of acquiring character information indicating a virtual character to be used by a distributor in a virtual space, additional information added to the character information, and/or limit information set by the distributor; a distribution step of distributing a live content according to an image in the virtual space in which a movement of the distributor is synthesized as a movement of the virtual character, on the basis of the character information acquired in the information acquisition step; and a behavior limiting step of limiting a behavior of a viewer viewing the live content, on the basis of the additional information and/or the limit information set by the distributor.

In addition, in order to attain the object described above, a program according to a fifth viewpoint of the disclosure for allowing a computer to function as: information acquisition means acquiring character information indicating a virtual character to be used by a distributor in a virtual space, additional information added to the character information, and/or limit information set by the distributor; distribution means distributing a live content according to an image in the virtual space in which a movement of the distributor is synthesized as a movement of the virtual character, on the basis of the character information acquired by the information acquisition means; and behavior limiting means limiting a behavior of a viewer viewing the live content, on the basis of the additional information and/or the limit information set by the distributor.

According to the disclosure, it is possible to provide a content distribution server or the like capable of limiting an undesirable behavior of a viewer.

BRIEF DESCRIPTION OF THE DRAWINGS

FIG. 6 is a diagram showing an example of information that is provided by the virtual character providing server according to the embodiment.

DETAILED DESCRIPTION

Hereinafter, an embodiment of the disclosure will be described with reference to the drawings. Note that, the embodiment described below does not unfairly limit the contents of the disclosure described in the claims. In addition, all constituents described in the embodiment are not limited to being essential constituents of the disclosure.

Figure 1:
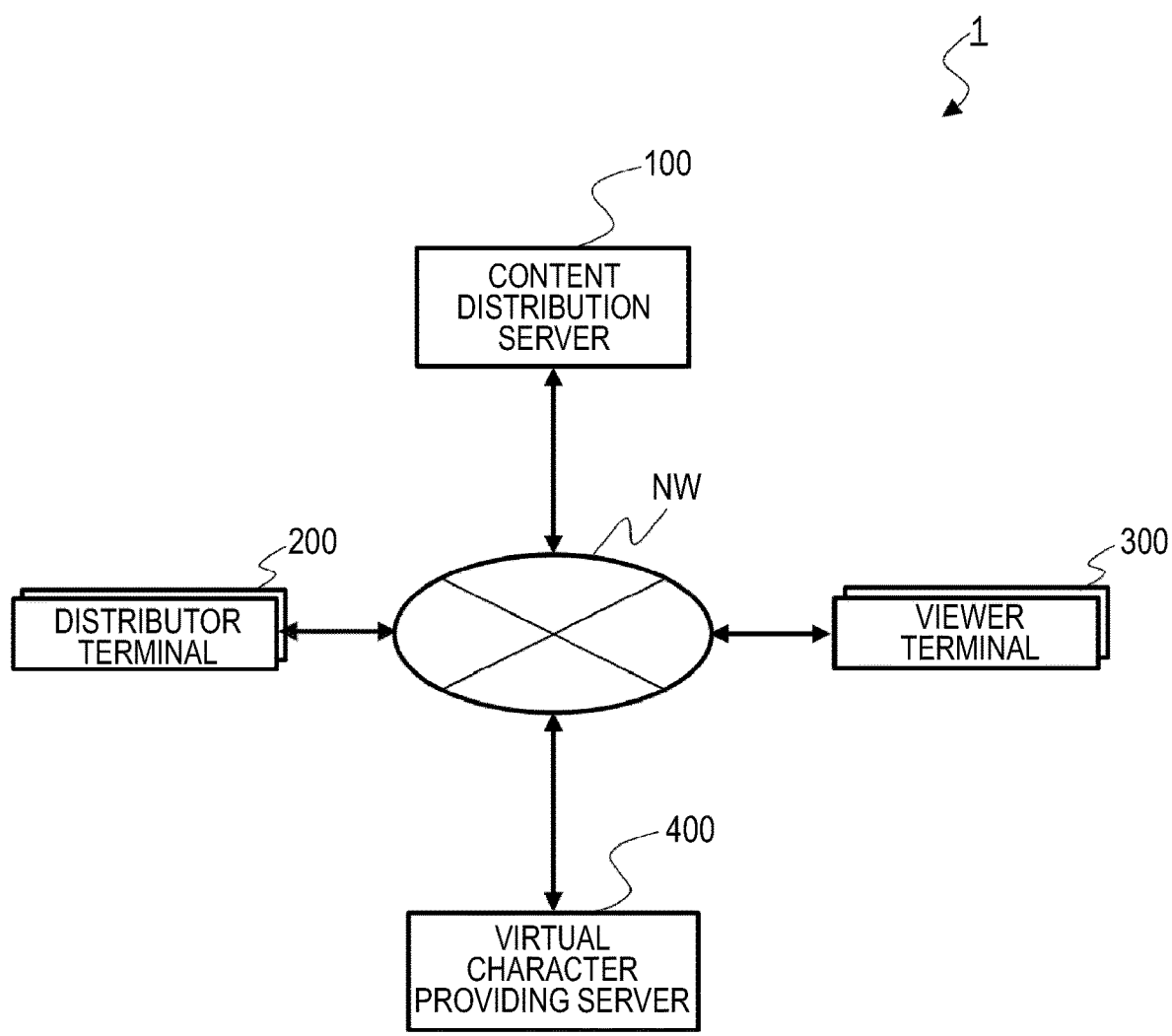
FIG. 1 is a diagram illustrating a configuration example of a content distribution system according to an embodiment.

As illustrated in FIG. 1, a content distribution system 1 according to this embodiment includes a content distribution server 100, one or more distributor terminals 200, one or more viewer terminals 300, and a virtual character providing server 400. The content distribution server 100, one or more distributor terminals 200, one or more viewer terminals 300, and the virtual character providing server 400 are connected to each other through a network NW such that communication can be performed. The network NW, for example, is a world area network (WAN).

The content distribution server 100 provides a distribution service through the network NW. The content distribution server 100 distributes a live content to the viewer terminal 300, on the basis of an image in a virtual space in which the movement of a distributor is synthesized as the movement of a virtual character.

In the image of the virtual space, not only the virtual character but also the background, an object indicating a virtual object, and the like are included. The virtual space is basically a three-dimensional space that is generated by computer graphics (CG). Note that, the virtual space may be a two-dimensional space. Note that, the distributor includes a distribution master who is a distributor managing the distribution, and other distributors who are distributors participating in the distribution. As described below, the other distributors may be viewers requesting the participation, or may be a distributor performing other distributions.

The distributor terminal 200 is used by the distributor distributing the live content. The distributor terminal 200 is a communication terminal provided with the HMD, and has a communication function and a motion capture function. The distributor terminal 200 acquires the movement (the gesture) or the visual line of the distributor as motion information by the motion capture function. The motion information is reflected on the movement of the virtual character associated with the distributor and the viewpoint of the image in the virtual space. Note that, the motion information may include data indicating the neutral expression of the distributor.

The viewer terminal 300 is used by the viewer viewing the live content. In a case where the viewer terminal 300 is for viewing only, the viewer terminal 300 is a device having a communication function, such as a personal computer, a tablet terminal, and a smartphone.

On the other hand, in a case where the viewer terminal 300 is not only for viewing but also for participation with respect to the distribution, the viewer terminal 300 is a communication terminal provided with the HMD, and has a communication function and a motion capture function. In this case, as with the distributor terminal 200, the viewer terminal 300 acquires the movement or the visual line of the viewer as the motion information, and the motion information is reflected on the virtual character or the viewpoint in the virtual space.

As described above, in a case where the viewer participates in the distribution, the viewer has the same authority as the distributor. However, in a case where the viewer participates as a guest, a part of the function of the viewer terminal 300 may be limited, compared to the distributor terminal 200.

In a case where the viewer intends to participate as a photographer, the viewer terminal 300 further has a function of controlling a virtual camera that photographs the inside of the virtual space. In this case, the viewer terminal 300 performs communication with respect to the content distribution server 100, and controls the viewpoint, the zoom, or the like of a viewing screen or a distribution screen according to the virtual camera.

The virtual character providing server 400 provides character information indicating a virtual character to be used by the distributor in the virtual space and additional information added to the character information. Note that, the virtual character providing server 400 may further provide object information indicating an object to be used by the distributor in the virtual space and additional information added to the object information.

In the distribution, the distributor uses the virtual character that is acquired from the virtual character providing server 400. Note that, in this embodiment, the virtual character providing server 400 has the configuration of providing the character information indicating the virtual character, and may have a configuration of providing the object information indicating the object.

<Configuration of Content Distribution Server>

Figure 2:
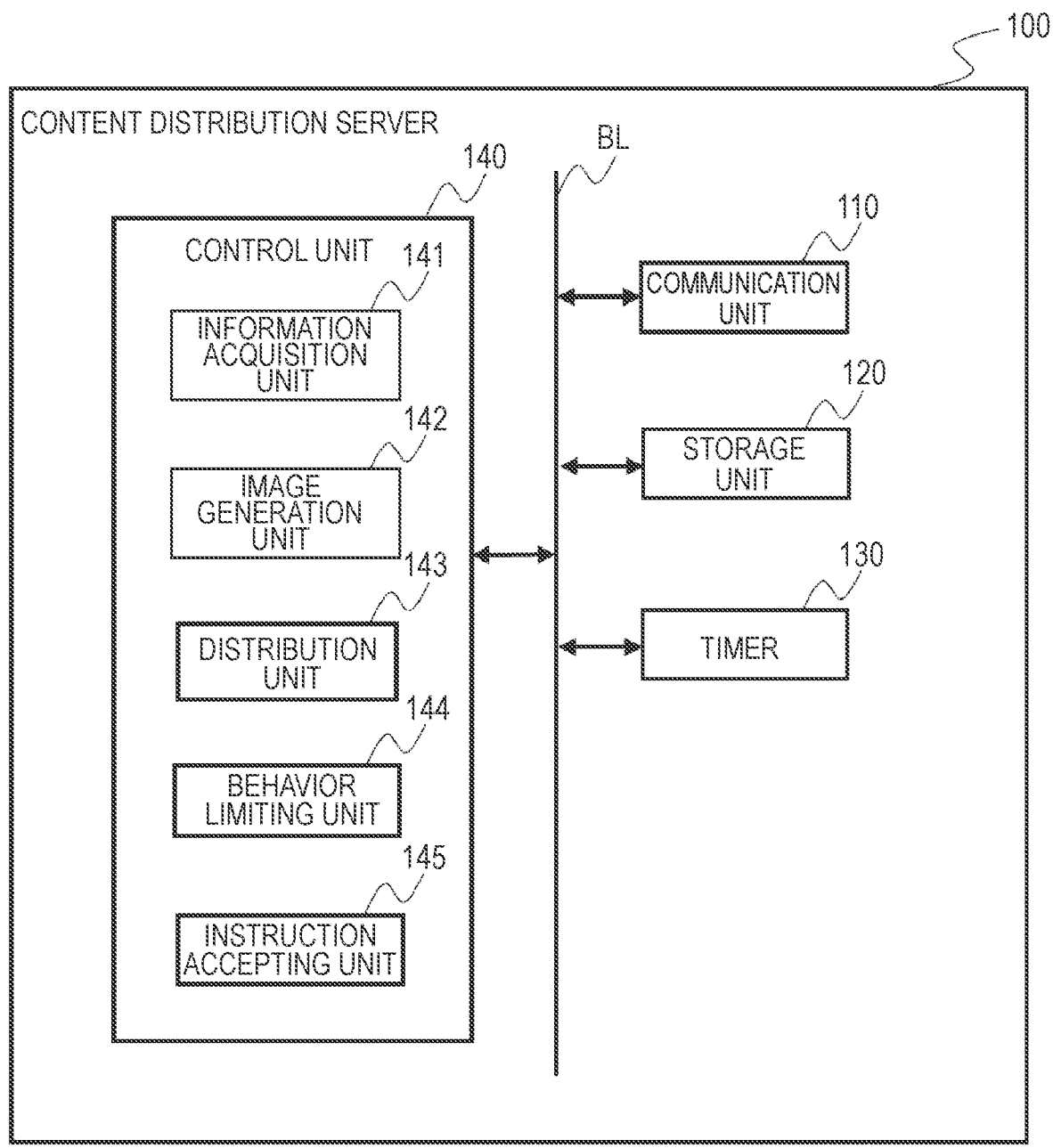
FIG. 2 is a block diagram illustrating a configuration example of the content distribution server according to the embodiment.

Hereinafter, the configuration of the content distribution server 100 will be described in detail. As illustrated in FIG. 2, the content distribution server 100 includes a communication unit 110 that performs communication with other devices, a storage unit 120 that stores various data items, a timer 130 that counts the time, and a control unit 140 that controls the entire device. Such constituents are connected to each other through a bus line BL.

The communication unit 110 is a communication interface including a network interface card controller (NIC) for performing wired communication or radio communication. The communication unit 110 performs communication with respect to the distributor terminal 200 and the viewer terminal 300 through the network NW.

The storage unit 120 includes a random access memory (RAM), a read only memory (ROM), and the like. The storage unit 120 stores a program for executing various control processings, various data items, and the like. For example, the storage unit 120 stores the additional information or a limit.

The timer 130 includes an oscillation circuit and variable phase locked loop (PLL) for generating a clock signal, a counter circuit for counting a pulse number of the clock signal, and the like. The timer 130 counts the time on the basis of the pulse number to be counted.

The control unit 140 includes a central processing unit (CPU) and the like. The control unit 140 executes the program that is stored in the storage unit 120, and thus, controls the entire motion of the content distribution server 100.

The control unit 140 executes various controls at a timing based on the pulse number that is counted by the timer 130. In addition, the control unit 140 counts an elapsed time from a start time point of the live content or determines whether or not a time set in advance (for example, a distribution estimated time) has elapsed, on the basis of the time that is counted by the timer 130.

Hereinafter, the functional configuration of the control unit 140 will be described. The control unit 140 functions as an information acquisition unit 141, an image generation unit 142, a distribution unit 143, a behavior limiting unit 144, and an instruction accepting unit 145.

The information acquisition unit 141 acquires information relevant to the virtual character to be used by the distributor, and the motion information indicating the movement or the visual line of the distributor from the distributor terminal 200 through the communication unit 110. The information relevant to the virtual character includes the character information indicating the virtual character and the additional information added to the character information. The information acquisition unit 141 acquires sound information from the distributor terminal 200 through the communication unit 110. In a case where the viewer participates in the distribution, the information acquisition unit 141 also acquires the information from the viewer terminal 300, as with the distributor terminal 200.

Note that, the information acquisition unit 141 may acquire the object information indicating the object to be used by the distributor and the additional information thereof from the distributor terminal 200 through the communication unit 110. In addition, the information acquisition unit 141 may directly acquire the information indicating the virtual character, the object information, and the additional information from the virtual character providing server 400, in accordance with an instruction of the distributor. That is, the information acquisition unit 141 is not limited to the configuration of acquiring the information from the distributor terminal 200.

In addition, the information acquisition unit 141 accepts an NG word, limit information, or the like, set by the distributor, from the distributor terminal 200 through the communication unit 110. The limit information is information including any one of photographing limit information, viewing limit information, commercial use limit information, and storage limit information. The NG word is a keyword of which posting or display is regulated. In the distribution, in a case where the NG word is included in a comment that is posted from the viewer, the posting of the comment is rejected or at least the part of the NG word is displayed in an unbrowsable state.

The image generation unit 142 generates the image in the virtual space in which the movement of the distributor is synthesized as the movement of the virtual character. In a case where there are a plurality of distributors (including the viewer participating in the distribution), an image including each virtual character is generated. The synthesis is attained, for example, by generating an image such that the image in the virtual space set in advance is used as the background and as if the virtual character exists in the background, and by generating an image such that the movement of the distributor using the virtual character is reflected on the virtual character.

The distribution unit 143 distributes the live content, on the basis of the image that is generated by the image generation unit 142. The live content based on the generated image is information indicating an image based on each viewpoint with respect to the generated image data. Specifically, the live content includes information indicating an image in a case where the generated image is seen at the viewpoint of the virtual character of the distributor and an image in a case where the generated image is seen at the viewpoint of the virtual camera.

The live content to be distributed by the distribution unit 143 includes not only the information indicating the image, but also the sound information. The distribution unit 143 distributes the sound information that is acquired by the information acquisition unit 141, and the sound information that is used in production and is stored in advance in the storage unit 120, as the live content.

The behavior limiting unit 144 limits the behavior of the viewer viewing the live content by using the viewer terminal 300, on the basis of the additional information acquired by the information acquisition unit 141 or the limit information set by the distributor using the distributor terminal 200.

The instruction accepting unit 145 accepts the comment that is posted from the viewer. Note that, the instruction accepting unit 145 may further accept a comment that is posted from the distributor.

In addition, the instruction accepting unit 145 accepts participation accepting information indicating a setting for accepting the participation with respect to the distribution from the distributor terminal 200, and participation request information indicating the notification of the corresponding participation request from the other distributor terminal 200 or viewer terminal 300. Accordingly, the content distribution server 100 enables the other distributor or the viewer to participate in the virtual space that is distributed by the distributor, by using the virtual character.

In addition, the instruction accepting unit 145 accepts the instruction of the viewer for providing one or more of money, a game value, a voucher, and a benefit from the viewer terminal 300. Note that, the instruction accepting unit 145 may accept the instruction of the other distributor for providing one or more of the money, the game value, the voucher, and the benefit from the other distributor terminal 200.

Such an action for providing one or more of the money, the game value, the voucher, and the benefit by the instruction is an action for inputting money, a cashable item, a point, a voucher for enabling the external service, event, or the like to be experienced, a voucher that is exchangeable with a real commodity, a benefit including a special image or music, and the like to the distribution or each of the distributors participating in the distribution. The action for providing one or more of the money, the game value, the voucher, and the benefit is commercial use action including throwing money that is a delivery action of money or a point, and an action for causing charging, gacha, or the like. One or more of the money, the game value, the voucher, and the benefit, which are provided, may be sorted to a distribution sponsor, the distributor, a manager of the content distribution server 100, and the like. The viewer or the other distributor may throw the money, the point, or the like to authorized people of the distribution.

In addition, the instruction accepting unit 145 accepts the manipulation of the virtual camera from the viewer terminal 300 that is used by the viewer participating as the photographer. Accordingly, in the virtual camera, a photographing angle or a photographing position is changed, or a zoom is changed, in accordance with the instruction of the viewer.

<Specific Contents of Limit and Harmonization of Plurality of Limits>

Here, specific contents of the limit of the behavior limiting unit 144 and the harmonization of a plurality of limits will be described. First, the behavior limiting unit 144 limits the behavior of the viewer, on the basis of the additional information to be added to the virtual character or the object, and the behavior limiting unit 144 limits the behavior of the viewer, on the basis of the limit information set by the distributor.

For example, in a case where the additional information acquired by the information acquisition unit 141 indicates that the virtual character is an official character, the behavior limiting unit 144 limits the comment that is posted with respect to the distribution using the virtual character by the viewer. The limit of the comment is performed on the basis of the NG word set by the virtual character or a comment disapproval setting.

For example, in a case where the NG word is set, the behavior limiting unit 144 rejects the posting of the comment including the NG word, or partially hides the comment. In the contents of the NG word, for example, a keyword leading to the collapse of the world view is set. On the other hand, in a case where the comment disapproval setting is set, the behavior limiting unit 144 performs control such that the posting of the comment is not accepted or the posted comment is not displayed on the distribution screen, regardless of the contents of the comment. The comment disapproval setting, for example, is set when an image source is strongly demanded, for example, in a case where the virtual character is a character or the like that is issued by an official organization and a government agency. Accordingly, it is possible to reduce a comment that is unsuitable for the distribution in which the official character is used. For example, it is possible to prevent the official character of a public organization, a company, a character provider, or the like from being insulted by the viewer and the honor of a provision source of the official character from being damaged.

In addition, the behavior limiting unit 144 limits the comment that is posted with respect to the distribution by the viewer, on the basis of the NG word set by the distributor or the comment disapproval setting. Accordingly, it is possible to prevent the world view of the distributor or the provider of the virtual character, such as an object, a target, and a policy, from collapsing by an unsuitable comment.

The behavior limiting unit 144 limits the manipulation of the virtual camera by the viewer for photographing the inside of the virtual space, on the basis of the photographing limit information set by the distributor and/or the photographing limit information to be included in the additional information. The manipulation of the virtual camera to be limited includes a change in the photographing direction or the photographing position, and a change in zoom-in and zoom-out.

Accordingly, it is possible to prevent the world view of the distributor or the provider of the virtual character from collapsing by an unsuitable photographing action. The unsuitable photographing action, for example, is a photographing action that is undesirable for the distributor, such as an action for photographing a virtual character wearing a miniskirt from the bottom, an action for enlargedly photographing the hand leading to a spoiler, and an action for photographing a place corresponding to a backstage dressing room.

The behavior limiting unit 144 limits the action of the viewer for participating in the virtual space by using the virtual character, on the basis of the participation limit information set by the distributor and/or the participation limit information to be included in the additional information. The behavior limiting unit 144 limits the viewing of the viewer with respect to the distribution, on the basis of the viewing limit information set by the distributor and/or the viewing limit information to be included in the additional information.

Accordingly, it is possible to prevent the world view of the distributor or the provider of the virtual character from collapsing by a participant or the viewer. For example, it is set that only the viewer participating in the distribution as the virtual character is capable of viewing the situation in the virtual space during the distribution. It may be set that the viewer is capable of only viewing and is not capable of participating in the virtual space. It may be set that only the first viewer who participates or logs in is capable of viewing the image in the virtual space.

The behavior limiting unit 144 limits the action of the viewer for providing one or more of the money, the game value, the voucher, and the benefit with respect to the distribution, on the basis of the commercial use limit information set by the distributor and/or the commercial use limit information to be included in the additional information. Accordingly, it is possible to prevent the world view of the distributor or the provider of the virtual character, who does not want the distribution associated with the movement of the money, from collapsing by the action for providing one or more of the money, the game value, the voucher, and the benefit. For example, such a setting may be provided in a case where the distributor is prohibited from using the official character as a commercial object by the provision source of the official character.

The behavior limiting unit 144 limits the action of the viewer for storing distribution data in the viewer terminal 300 that is used by the viewer or the action of the viewer for reprinting the distribution data on other sites, on the basis of the storage limit information set by the distributor or the storage limit information to be included in the additional information. The distribution data to be a target may be moving image data, or may be still image data such as a screenshot.

Accordingly, it is possible to protect the copyright of data such as the distribution or the virtual character. In addition, even in a case where a use period of the virtual character or a viewing period of the distribution is limited or the virtual character has a special event specification, the right relevant to the distribution or the virtual character is protected.

However, in a case where the plurality of distributors (including the viewer participating in the distribution) participate in the distribution, the world view with respect to the distribution may be different in accordance with each of the plurality of distributors. In addition, the type of main viewer often viewing the distribution of the distributor may be different. For example, normally, the viewer is likely to post a serious comment or an intellectual comment with respect to the distribution of the distributor on the subject matter of a social problem. On the other hand, normally, the viewer is likely to post a joke-like comment with respect to the distribution of the distributor excited with a subject relevant to a comedy.

Each of the plurality of distributors may perform different limit settings from such a difference in the world views. In addition, not only the distributor but also the provider of the virtual character may further have different world views.

Therefore, in a case where the plurality of distributors participate in the virtual space by using the virtual character, the behavior limiting unit 144 harmonizes the plurality of limits that are indicated by a plurality of additional information items corresponding to a plurality of virtual characters and/or a plurality of limit information items set by the plurality of distributors. The behavior limiting unit 144 limits the behavior of the viewer viewing the live content, on the basis of the harmonized limits. The harmonization is attained by one or more of a plurality of methods described below.

For example, the behavior limiting unit 144 superimposes and applies all of the plurality of limits. In a case where contradicting limits are included in the plurality of limits, the behavior limiting unit 144 notifies contradicting settings to one or more of the plurality of distributors participating in the virtual space, and selects one of an approval setting and a disapproval setting as a setting to be applied.

In a case where the contradicting limits are included in the plurality of limits, the behavior limiting unit 144 may accept a setting that is necessary to be applied and a setting that is not necessary to be applied from one or more of the plurality of distributors participating in the virtual space, and may harmonize the plurality of limits, on the basis of the accepted setting. For example, in a case where a virtual character subjected to the comment disapproval setting and a virtual character not subjected to the comment disapproval setting are mixed, the comment may be prohibited with respect to the entire distribution. For example, in a case where a virtual character of which the commercial use is prohibited and a virtual character of which the commercial use is not prohibited are mixed, the action for providing one or more of the money, the game value, the voucher, and the benefit with respect to the distributor of the virtual character of which the commercial use is not prohibited may be permitted, and in a case where it is set that one of the distributors necessarily prohibits the commercial use, the action for providing one or more of the money, the game value, the voucher, and the benefit with respect to the entire distribution may be prohibited.

In a case where the contradicting limits are included in the plurality of limits, the behavior limiting unit 144 may preferentially apply the setting of a premium member included in the plurality of distributors participating in the virtual space to the setting of the other distributor who is not the premium member. The premium member, for example, is a paid member with respect to a general free member or a member who pays a high membership fee with respect to the other paid member.

In a case where the contradicting limits are included in the plurality of limits, the behavior limiting unit 144 may preferentially apply the disapproval setting to the approval setting. Accordingly, all demands for prohibition can be satisfied.

In a case where the contradicting limits are included in the plurality of limits, the behavior limiting unit 144 may cancel the approval setting and the disapproval setting contradicting each other. Accordingly, it is possible to prevent a confusion due to contradictory settings.

<Configuration of Distributor Terminal>

Figure 3:
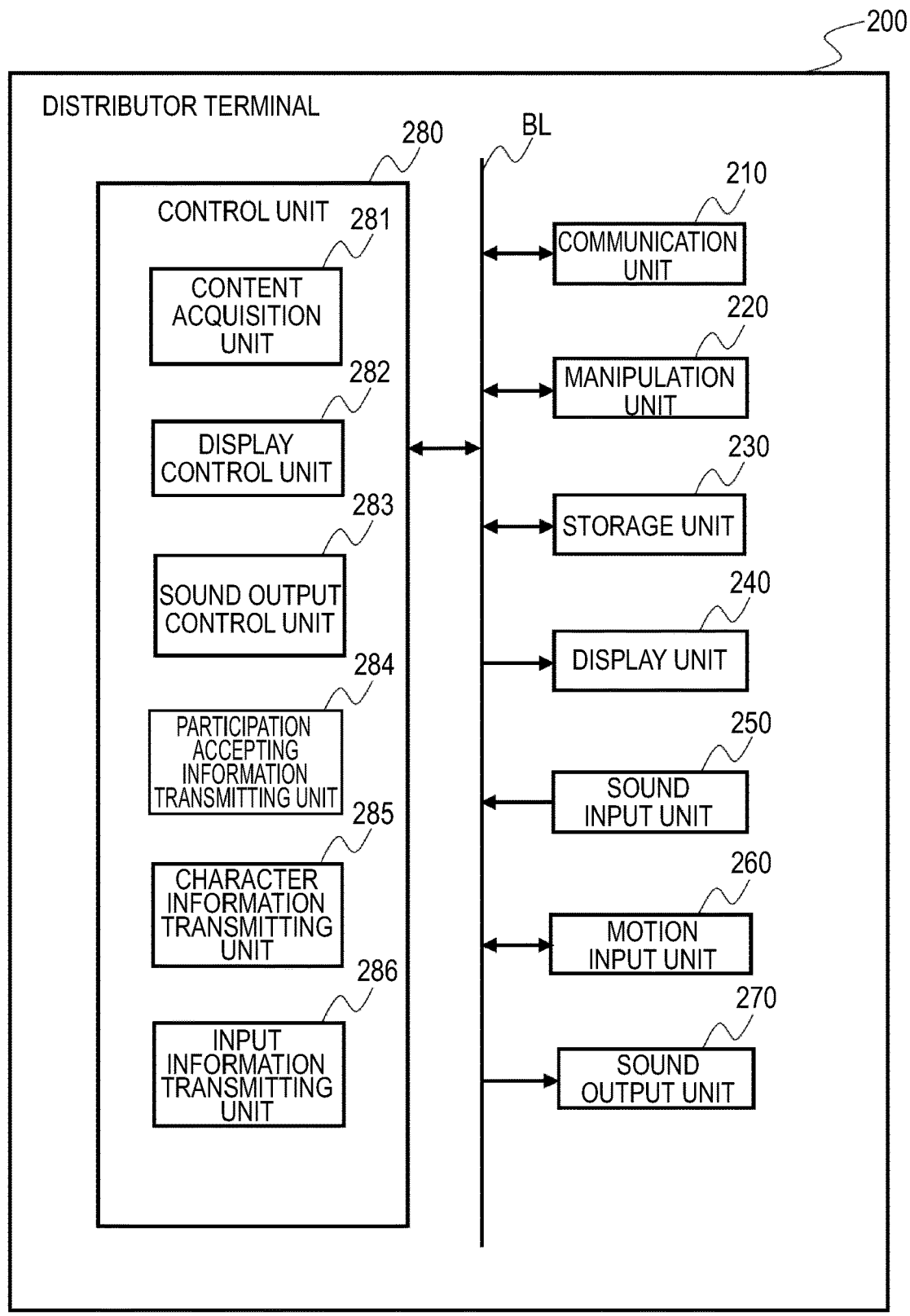
FIG. 3 is a block diagram illustrating a configuration example of a distributor terminal according to the embodiment.

Hereinafter, the configuration of the distributor terminal 200 will be described in detail. As illustrated in FIG. 3, the distributor terminal 200 includes a communication unit 210 that performs communication with respect to other devices, a manipulation unit 220 that accepts the manipulation of the user, a storage unit 230 that stores various data items, a display unit 240 that displays various images, a sound input unit 250 that accepts sound input, a motion input unit 260 for inputting the motion information, a sound output unit 270 that outputs various sounds, and a control unit 280 that controls the entire device. Such constituents are connected to each other through the bus line BL.

The communication unit 210 is a communication interface provided with the NIC for performing wired communication or radio communication. The communication unit 210 performs communication with respect to the content distribution server 100 through the network NW.

The manipulation unit 220 includes one or more of a manipulation button, a keyboard, a pointing device, and the like, and is an interface that is used by the user in order to input an instruction.

The storage unit 230 includes a RAM, a ROM, and the like. The storage unit 230 stores a program for executing various control processings, input data, and the like.

The display unit 240, for example, includes an LCD, an EL display, and the like. The display unit 240 displays a text, an image, or the like, in accordance with the input data from the control unit 280.

The sound input unit 250 includes a microphone and the like. The sound input unit 250 accepts a sound input from the outside and acquires the sound information.

The motion input unit 260 accepts an input manipulation of the user and acquires the input manipulation as the motion information of the user. The motion input unit 260, for example, includes a camera, a sensor, and the like for acquiring the motion information by a motion capture technology. The motion information, for example, is sensed by a sensor that senses the visual line and the movement (the gesture) of the user. In addition, the motion information may be acquired by a button manipulation for representing the neutral expression, a predetermined production motion, or the like of the virtual character.

Note that, processing for converting the motion information of the user into the motion, the visual line, or the like of the virtual character may be executed in the distributor terminal 200, may be executed in the content distribution server 100, or may be executed by the cooperation between the content distribution server 100 and the distributor terminal 200.

The sound output unit 270, for example, includes a speaker, an amplifier, and the like. The sound output unit 270 outputs a sound, in accordance with the input data from the control unit 280.

The control unit 280 includes a CPU and the like. The control unit 280 executes the program that is stored in the storage unit 230, and thus, controls the entire motion of the distributor terminal 200.

Hereinafter, the functional configuration of the control unit 280 will be described. The control unit 280 functions as a content acquisition unit 281, a display control unit 282, a sound output control unit 283, a participation accepting information transmitting unit 284, a character information transmitting unit 285, and an input information transmitting unit 286.

The content acquisition unit 281 acquires data indicating the live content from the content distribution server 100 through the communication unit 210. The display control unit 282 allows the display unit 240 to display the image in the virtual space, on the basis of the data indicating the live content, which is acquired by the content acquisition unit 281. The sound output control unit 283 outputs a sound to the sound output unit 270, on the basis of the data indicating the live content, which is acquired by the content acquisition unit 281.

The participation accepting information transmitting unit 284 transmits the participation accepting information to the content distribution server 100 through the communication unit 210. The participation accepting information is information indicating a setting of accepting the participation with respect to the distribution, which is input by the user through the manipulation unit 220.

The character information transmitting unit 285 transmits the character information of the virtual character that is used by the user and the additional information thereof to the content distribution server 100 through the communication unit 210. Note that, the character information transmitting unit 285 may transmit the object information of the object that is used by the user and the additional information thereof to the content distribution server 100. Note that, such information is information that is acquired by being downloaded from the virtual character providing server 400 by the user and is stored in the storage unit 230.

The input information transmitting unit 286 transmits the sound information acquired in the sound input unit 250 and the motion information acquired in the motion input unit 260 to the content distribution server 100. Note that, the input information transmitting unit 286 may transmit information after reflecting the motion information on the virtual character to the content distribution server 100.

<Configuration of Viewer Terminal>

Figure 4:
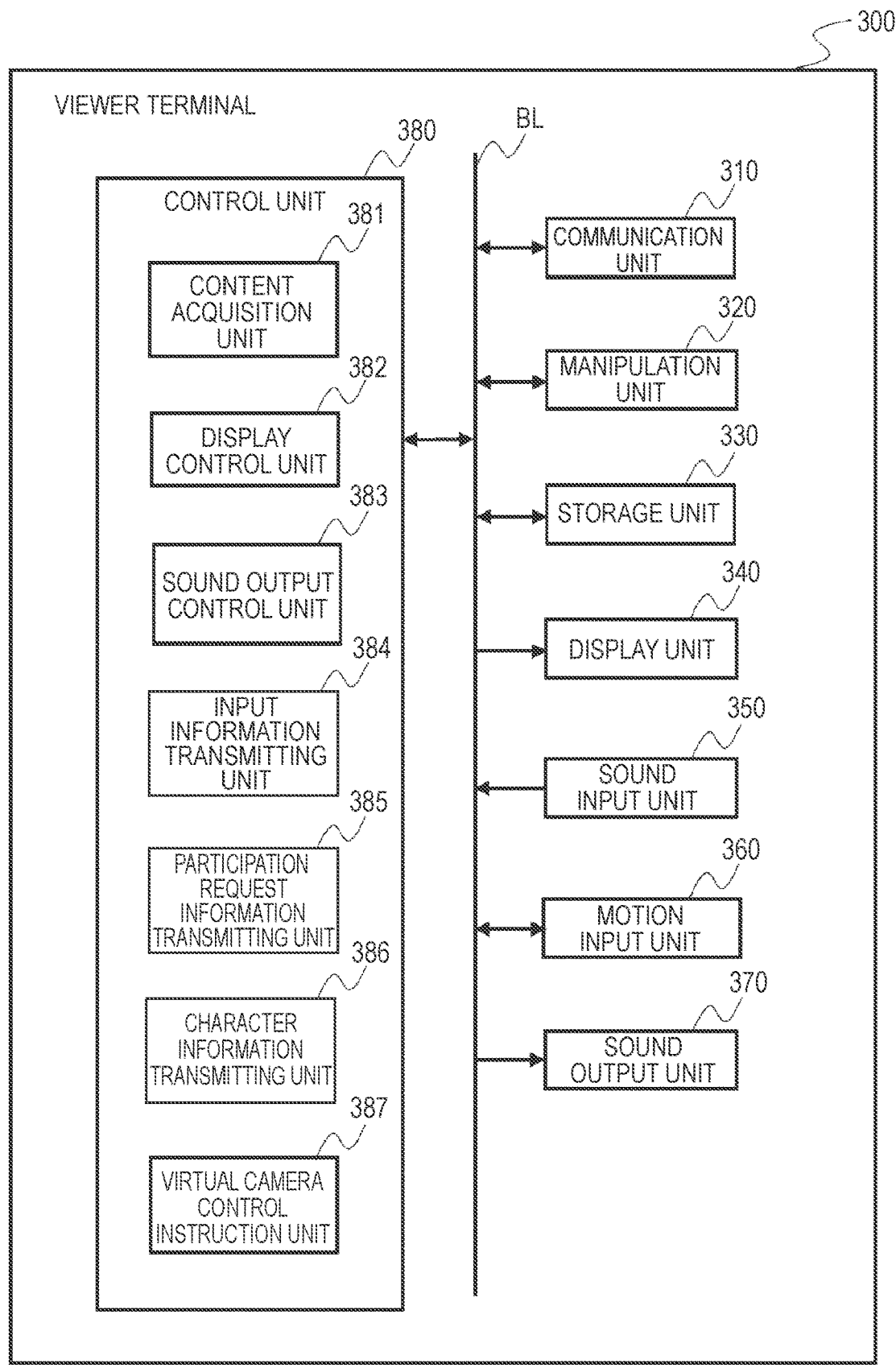
FIG. 4 is a block diagram illustrating a configuration example of a viewer terminal according to the embodiment.

Hereinafter, the configuration of the viewer terminal 300 will be described in detail. As illustrated in FIG. 4, the viewer terminal 300 includes a communication unit 310 that performs communication with respect to other devices, a manipulation unit 320 that accepts the input manipulation of the user, a storage unit 330 that stores various data items, a display unit 340 that displays various images, a sound input unit 350 that accepts sound input, a motion input unit 360 for inputting the motion information, a sound output unit 370 that outputs a sound, and a control unit 380 that controls the entire device. Such constituents are connected to each other through the bus line BL.

The configuration of the viewer terminal 300 is basically identical to the configuration of the distributor terminal 200. For example, the viewer terminal 300 has a function of acquiring the motion information of the viewer, as information necessary for the viewer to participate in the distribution, and of transmitting the motion information to the content distribution server 100 in order to reflect the motion information on the motion of the virtual character of the viewer. However, in the control unit 380 of the viewer terminal 300, a part of the functional configuration is different from that of the control unit 280 of the distributor terminal 200.

Hereinafter, the functional configuration of the control unit 380 will be described. The control unit 380 functions as a content acquisition unit 381, a display control unit 382, a sound output control unit 383, an input information transmitting unit 384, a participation request information transmitting unit 385, a character information transmitting unit 386, and a virtual camera control instruction unit 387.

The content acquisition unit 381 acquires data indicating the live content from the content distribution server 100 through the communication unit 310. The display control unit 382 allows the display unit 340 to display the image in the virtual space, on the basis of the data indicating the live content, which is acquired by the content acquisition unit 381.

In addition, the display control unit 382 acquires list information that is distributed from the content distribution server 100 through the communication unit 310, and allows the display unit 340 to display a screen indicating the list information of the distribution in which a participation request is accepted. The sound output control unit 383 outputs a sound to the sound output unit 370, on the basis of the data indicating the live content, which is acquired by the content acquisition unit 381.

The input information transmitting unit 384 transmits input information that is input by the user through the manipulation unit 320 to the content distribution server 100 through the communication unit 310. The input information, for example, is information including one or more of instruction input for providing one or more of the comment that is posted by the viewer, instruction input for providing one or more of money, a game value, a voucher, and a benefit and instruction input for acquiring the data relevant to the distribution.

The participation request information transmitting unit 385 transmits the participation request information indicating the participation request to the content distribution server 100 through the communication unit 310. Specifically, in a case where the user wants the participation with respect to the screen indicating the list information of the distribution in which the participation request is accepted, the participation request information transmitting unit 385 transmits the participation request information.

The character information transmitting unit 386 transmits the character information of the virtual character that is used by the user and the additional information thereof to the content distribution server 100 through the communication unit 310. Note that, the character information transmitting unit 386 may transmit the object information of the object that is used by the user and the additional information thereof to the content distribution server 100. Note that, such information is information that is acquired by being downloaded from the virtual character providing server 400 by the user and is stored in the storage unit 330.

The virtual camera control instruction unit 387 transmits a control signal for controlling the virtual camera that photographs the image in the virtual space to the content distribution server 100, in accordance with an instruction that is input from the manipulation unit 320 by the user. Note that, the image of the virtual camera may be reflected only on the viewing screen of the viewer terminal 300, or may be distributed to a plurality of viewer terminals 300 or a plurality of distributor terminals 200 as a distribution screen.

Note that, in the example illustrated in FIG. 4, the configuration of the viewer terminal 300 in a case where the viewer has all of the function of participating in the distribution as the photographer who manipulates the virtual camera, the function of participating in the virtual space that is distributed by using the virtual character, and the function of viewing the distribution is illustrated. However, the configuration of the viewer terminal 300 is not limited thereto.

For example, in the configuration described above, the viewer terminal 300 limits the application only to the viewing function, and may have a configuration not including the sound input unit 350, the motion input unit 360, the participation request information transmitting unit 385, the character information transmitting unit 386, and the virtual camera control instruction unit 387. In this case, the viewer terminal 300 is capable of having a simple configuration, and the viewer terminal 300 may be a smartphone or a PC but not the HMD. In addition, in the configuration described above, the viewer terminal 300 may have a configuration not including the virtual camera control instruction unit 387 without having the function of participating as the photographer. As described above, the viewer terminal 300 is capable of suitably changing the design in accordance with the application.

<Configuration of Virtual Character Providing Server>

Figure 5:
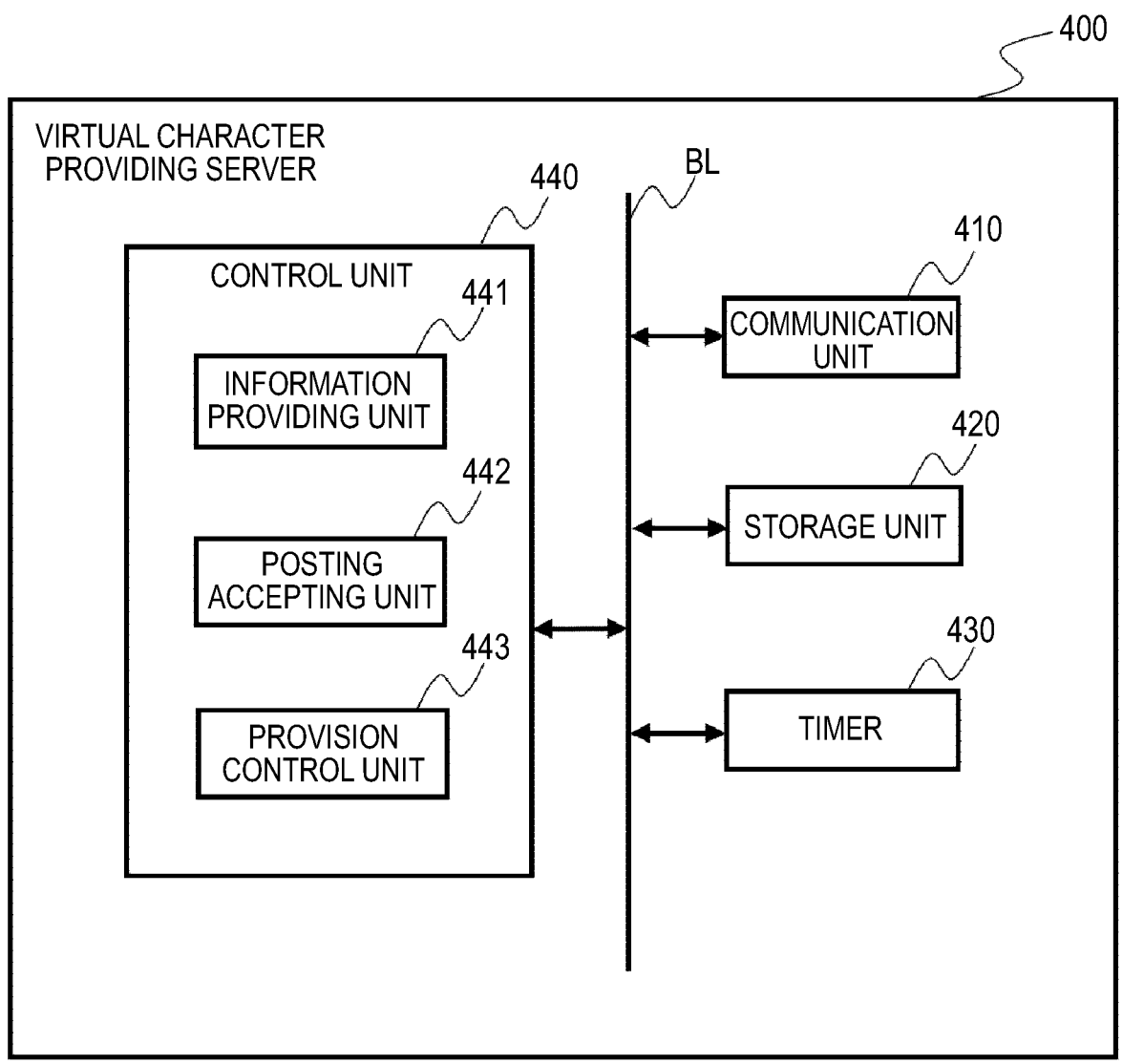
FIG. 5 is a block diagram illustrating a configuration example of a virtual character providing server according to the embodiment.

Hereinafter, the configuration of the virtual character providing server 400 will be described in detail. As illustrated in FIG. 5, the virtual character providing server 400 includes a communication unit 410 that performs communication with respect to other devices, a storage unit 420 that stores various data items, a timer 430 that counts the time, and a control unit 440 that controls the entire device. Such constituents are connected to each other through the bus line BL.

The communication unit 410 is a communication interface provided with the NIC for performing the wired communication or the radio communication. The communication unit 410 performs communication with respect to the user terminal through the network NW. The user terminal, for example, is the distributor terminal 200 that acquires the information of the virtual character or the like, the viewer terminal 300, and a poster terminal (not illustrated) that is used by a poster who posts the information of the virtual character or the like.

The storage unit 420 includes a RAM, a ROM, and the like. The storage unit 420 stores a program for executing various control processings, various data items, and the like. For example, the storage unit 420 stores information relevant to the virtual character, the object, or the like, which is posted by the poster.

In addition, the storage unit 420 stores the character information or the additional information added to the object information. In addition, the storage unit 420 stores information of the user using the user terminal (the distributor, the viewer, or the like, using the virtual character).

The timer 430 includes an oscillation circuit and a variable PLL for generating a clock signal, a counter circuit for counting a pulse number of the clock signal, and the like. The timer 430 counts the time, on the basis of the pulse number to be counted.

The control unit 440 includes a CPU and the like. The control unit 440 executes the program that is stored in the storage unit 420, and thus, controls the entire motion of the virtual character providing server 400. The control unit 440 executes various controls at a timing based on the pulse number that is counted by the timer 430. In addition, the control unit 440 determines whether or not a time set in advance (for example, a providing period or an available period of the character information, the object information, or the like) has elapsed, on the basis of the time that is counted by the timer 430.

Hereinafter, the functional configuration of the control unit 440 will be described. The control unit 440 functions as an information providing unit 441, a posting accepting unit 442, and a provision control unit 443.

The information providing unit 441 provides the character information, the object information, the additional information, and the like to the user and the distributor terminal 200 through the communication unit 410. The posting accepting unit 442 accepts the posting of the character information, the object information, the additional information, and the like from the poster terminal through the communication unit 410.

The provision control unit 443 performs control such that the information providing unit 441 does not provide the character information or the object information, which is not in the providing period. In addition, the provision control unit 443 notifies the providing period or the available period to the user terminal in which the character information or the object information is tried to be downloaded.

FIG. 6 shows an example of the information that is provided by the virtual character providing server 400. The information that is provided by the virtual character providing server 400 includes a poster ID indicating the poster posting the character information or the object information, an information ID to be uniquely applied to the posted information, an information type indicating that it is either the character information or the object information, a distribution state according to a distribution period (the providing period), the size of information to be provided (an information amount), and a URL for providing a download service of the additional information, the character information, or the object information. Such information items are stored in the storage unit 420 in association with each other.

Additional information A, additional information B, additional information C, additional information D, and additional information E, which are the additional information corresponding to each of the character information and the object information, include information indicating one or more of the availability of the commercial use, the display of the copyright, the availability of the modification, the availability of the redistribution, the world view of importance, an age limit, the providing period or the available period, and the presence or absence of the special event specification and the contents thereof.

In addition, such additional information items include information that is used for various limits in the content distribution server 100. For example, such additional information items include one or more of information of whether or not the virtual character is the official character, the photographing limit information, the viewing limit information, the participation limit information, the commercial use limit information, and the storage limit information.

<Flow of Processing>

Hereinafter, an example of the control processing that is executed by the content distribution server 100 will be described with reference to FIG. 7. Such processing is executed when the distributor terminal 200 logs in the content distribution server 100, and the preparation of the distribution of the live content is started.

First, the information acquisition unit 141 of the control unit 140 acquires the character information and the additional information from the distributor terminal 200 through the communication unit 110 (step S101). Note that, the information acquisition unit 141 may further acquire the object information and the additional information thereof.

The information acquisition unit 141 of the control unit 140 acquires the limit information set by the distributor from the distributor terminal 200 through the communication unit 110 (step S102).

Next, the distribution unit 143 of the control unit 140 allows the distributor terminal 200 to display an image that is synthesized (step S103). Specifically, the information acquisition unit 141 of the control unit 140 acquires the motion information from the distributor terminal 200 through the communication unit 110. The image generation unit 142 of the control unit 140 generates the image in the virtual space in which the movement of the distributor is synthesized as the movement of the virtual character. The distribution unit 143 of the control unit 140 transmits the information indicating the synthesized image in the virtual space to the distributor terminal 200 through the communication unit 110. Note that, in a case where each of the plurality of distributors performs the distribution by using the distributor terminal 200, information indicating an image of the viewpoint of the virtual character that is used by each of the plurality of distributors is distributed.

In addition, the distribution unit 143 of the control unit 140 distributes the live content to the viewer terminal 300, on the basis of the synthesized image in the virtual space (step S104). The live content is information indicating an image of the viewpoint of the virtual camera.

The behavior limiting unit 144 of the control unit 140 limits the behavior of the viewer viewing the live content, on the basis of the additional information and/or the limit information set by the distributor (step S105).

Figure 7:
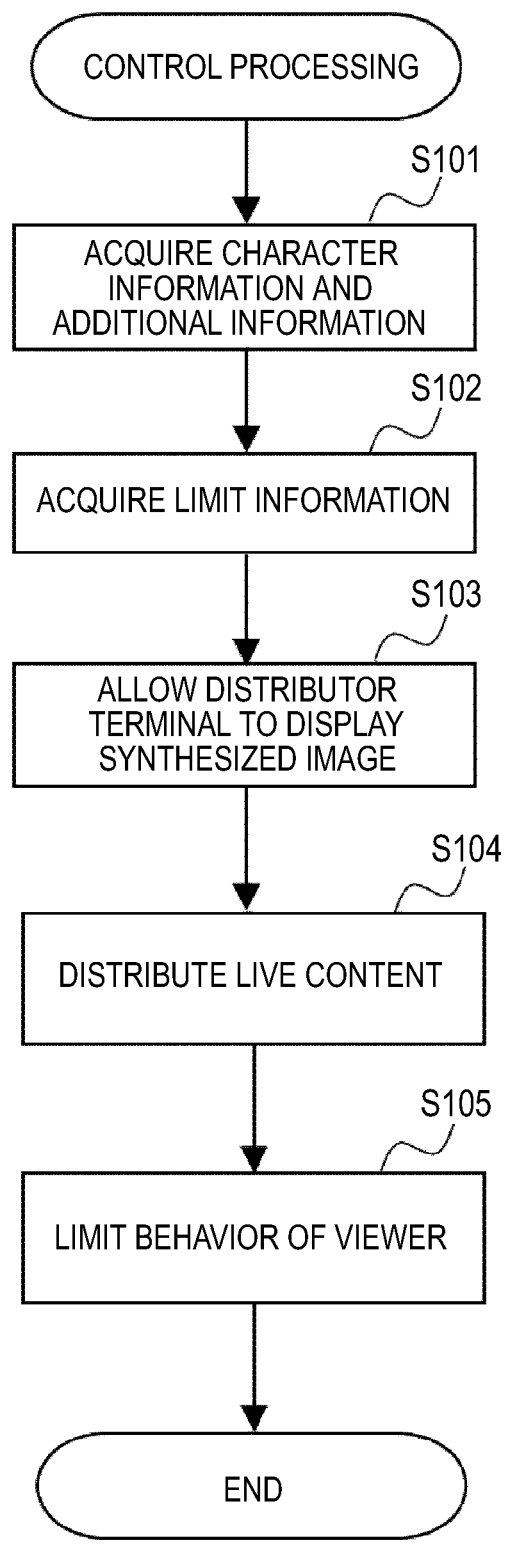
FIG. 7 is a flowchart illustrating an example of control processing of the content distribution server according to the embodiment.

Note that, the control processing that is executed by the content distribution server 100 is not limited to the example illustrated in FIG. 7. For example, the information acquisition unit 141 acquires the limit information every time when the distributor sets the limit information in the distributor terminal 200. For this reason, step S102 may be performed before step S101, or may be performed after step S103. In addition, the acquisition of the limit information may be executed a plurality of times. In a case where nobody sets the limit information, step S102 may be skipped.

In addition, in the example illustrated in FIG. 7, the other distributor or the viewer requesting the participation performs a transmission manipulation of the participation request information at an arbitrary timing, and is capable of participating in a case where the distributor who is the distribution master accepts the participation request information. In this case, the information acquisition unit 141 further acquires the character information, the additional information, the limit information, and the like of the participant. In a case where there is a limit setting contradicting the additional information or the limit information of the distributor who is the distribution master and one or more participants participating in the distribution, the behavior limiting unit 144 harmonizes such limits.

In the content distribution system 1 according to this embodiment, the content distribution server 100 acquires the character information, the additional information, and/or the limit information set by the distributor. The content distribution server 100 limits the behavior of the viewer viewing the live content, on the basis of the acquired additional information and/or the limit information set by the distributor. The additional information or the limit information includes information that is various standards for limiting an undesirable behavior of the viewer. For this reason, according to the content distribution system 1, it is possible to limit the undesirable behavior of the viewer.

The description of the embodiment is ended as described above, but the embodiment described above is merely an example. For this reason, the contents of a specific configuration, processing, or the like of the content distribution system 1 are not limited to those described in the embodiment. Hereinafter, a modification example of the embodiment described above will be described.

In the content distribution system 1 according to the embodiment described above, the behavior of the viewer is limited by both of the additional information and the limit information. However, the content distribution system 1 may acquire only one of the additional information and the limit information, and may limit the behavior of the viewer by the other one. That is, the content distribution system 1 may limit the behavior of the viewer by the additional information and/or the limit information.

In the content distribution system 1 according to the embodiment described above, the distributor terminal 200 and the viewer terminal 300 have different configurations, and thus, can be distinguished from each other. However, the devices may function as the distributor terminal 200 and the viewer terminal 300 by combining the constituents of each of the devices.

In the content distribution system 1 according to the embodiment described above, the image generation unit 142 of the content distribution server 100 generates the image in the virtual space in which the movement of the distributor is synthesized as the movement of the virtual character. However, the content distribution server 100 may not include the image generation unit 142. For example, the distributor terminal 200 may execute such image generation, may transmit the image data to the content distribution server 100, and may distribute the live content based on the image data that is acquired by the content distribution server 100 from the distributor terminal 200. In addition, processing that is substantially the same as the processing performed by the image generation unit 142 may be executed by the cooperation between the content distribution server 100 and the distributor terminal 200. According to such a configuration, it is possible to reduce a processing load of the content distribution server 100, compared to a case where the image in the virtual space is generated in the content distribution server 100.

In a case where joint distribution is performed in a configuration in which the distributor terminal 200 executes the image generation, the terminal of the participant participating in the distribution (for example, the distributor terminal 200 that is used by the distributor or the viewer terminal 300 that is used by the viewer participating in the distribution) acquires the motion information and the character information of the participant, generates the image in which the movement of the participant is reflected on the virtual character, and transmits the image to the content distribution server 100. The content distribution server 100 transmits the image data to the distributor terminal 200 that is used by the distribution master of the distribution of a participation destination. The distributor terminal 200 that is used by the distribution master acquires the motion information and the character information of the distributor who is the distribution master, generates the image in the virtual space, adds the image data of the participant thereto, which is acquired from the content distribution server 100, and synthesizes both of the images. Accordingly, image data is generated in which the participant and the distribution master are reflected together. The distributor terminal 200 of the distribution master transmits the synthesized image data to the content distribution server 100, and the content distribution server distributes the live content based on the image data.

In addition, the terminal of the participant may not generate the image, but the terminal of the participant may transmit the character information, the motion information, the additional information, and the like of the participant to the content distribution server 100, the content distribution server 100 may transmit such information items to the distributor terminal 200 that is used by the distribution master, and the distributor terminal 200 may generate an image by reflecting both of the motion information or the like of the participant and the motion information or the like of the distribution master in one virtual space. Accordingly, the image data is generated in which the participant and the distribution master are reflected together, and thus, the content distribution server is capable of distributing the live content based on the image data.

Note that, even in a case where the distributor terminal 200 executes the image generation, the distributor terminal 200 also transmits the additional information at the time of transmitting the generated image data, and thus, the content distribution server 100 is capable of limiting the behavior of the viewer by identifying the additional information. For example, in a case where the viewer performs throwing money, the instruction is transmitted to the content distribution server 100 from the viewer terminal 300. After that, information indicating the movement of the money based on the instruction is transmitted to the distributor terminal 200 from the content distribution server 100, and the distributor terminal 200, for example, generates an image in which an image indicating a state in which the throwing money is thrown is incorporated. The distributor terminal 200 transmits the image data to the content distribution server 100 again, and the content distribution server 100 distributes the live content based on the image data. In this case, in a case where the additional information includes the limit of commercial use prohibition, the content distribution server 100 may block the information indicating the movement of the money not to be sent to the distributor terminal 200, or may not accept the instruction of the throwing money from the first.

As described above, it is not necessary that the content distribution server 100 includes the image generation unit 142 for generating the image in the virtual space by the own device, but the image in the virtual space in which the movement of the distributor (or the participant) is synthesized as the movement of the virtual character may be acquired, and the live content according to the image may be distributed.

In addition, the content distribution system 1 according to the disclosure, for example, may attain the function by executing a program with a computer, regardless of the device described above. The program for attaining the function of the content distribution system 1 may be stored in a computer-readable recording medium such as a universal serial bus (USB) memory, a compact disc-read only memory (CD-ROM), a digital versatile disc (DVD), and a hard disc drive (HDD), or may be downloaded in the computer through a network.

Hereinbefore, a preferred embodiment of the disclosure has been described, but the disclosure is not limited to such a specific embodiment, and the disclosure includes the invention described in the claims and the equivalent. In addition, the configurations of the devices described in the embodiment and the modification example described above can be suitably combined unless there is a technical contradiction.

REFERENCE SIGNS LIST

1 Content distribution system
100 Content distribution server
200 Distributor terminal
300 Viewer terminal
400 Virtual character providing server
110, 210, 310, 410 Communication unit
120, 230, 330, 420 Storage unit
130, 430 Timer
140, 280, 380, 440 Control unit
141 Information acquisition unit
142 Image generation unit
143 Distribution unit
144 Behavior limiting unit
145 Instruction accepting unit
220, 320 Manipulation unit
240, 340 Display unit
281, 381 Content acquisition unit
282, 382 Display control unit
283, 383 Sound output control unit
284 Participation accepting information transmitting unit
285, 386 Character information transmitting unit
286, 384 Input information transmitting unit
385 Participation request information transmitting unit
387 Virtual camera control instruction unit
441 Information providing unit
442 Posting accepting unit
443 Provision control unit

The invention claimed is:

1. A content distribution server which is configured to:
acquire additional information for limiting a behavior of a viewer in distribution using a virtual character, which is added to the virtual character to be used by a distributor in a virtual space, and/or limit information for limiting the behavior of the viewer in the distribution using the virtual character, which is set by the distributor;
distribute a live content according to an image in the virtual space in which a movement of the distributor is synthesized as a movement of the virtual character; and
limit the behavior of the viewer viewing the live content, on the basis of the additional information and/or the limit information set by the distributor,
wherein limiting the behavior of the viewer comprises limiting a manipulation of a virtual camera by the viewer for photographing an inside of the virtual space, on the basis of photographing limit information set by the distributor and/or photographing limit information to be included in the additional information.

2. A content distribution server which is configured to:
acquire additional information for limiting a behavior of a viewer in distribution using a virtual character, which is added to the virtual character to be used by a distributor in a virtual space, and/or limit information for limiting the behavior of the viewer in the distribution using the virtual character, which is set by the distributor;
distribute a live content according to an image in the virtual space in which a movement of the distributor is synthesized as a movement of the virtual character; and limit the behavior of the viewer viewing the live content, on the basis of the additional information and/or the limit information set by the distributor, wherein limiting the behavior of the viewer comprises limiting an action of the viewer for participating in the virtual space by using the virtual character, on the basis of participating limit information set by the distributor and/or participating limit information to be included in the additional information.

3. The content distribution server according to claim 1, wherein limiting the behavior of the viewer further comprises limiting a comment that is posted with respect to distribution by the viewer.

4. The content distribution server according to claim 1, wherein limiting the behavior of the viewer further comprises limiting the comment that is posted with respect to the distribution by the viewer, on the basis of an NG word or a comment disapproval setting.

5. The content distribution server according to claim 1, wherein limiting the behavior of the viewer further comprises limiting viewing of the viewer with respect to the distribution, on the basis of viewing limit information set by the distributor and/or viewing limit information to be included in the additional information.

6. The content distribution server according to claim 1, wherein limiting the behavior of the viewer further comprises limiting an action of the viewer for providing one or more of money, a game value, a voucher, and a benefit with respect to the distribution, on the basis of commercial use limit information set by the distributor and/or commercial use limit information to be included in the additional information.

7. The content distribution server according to claim 1, wherein in a case where a plurality of distributors participate in the virtual space by using the virtual character, limiting the behavior of the viewer further comprises limiting the behavior of the viewer viewing the live content by harmonizing a plurality of limits that are indicated by a plurality of additional information items corresponding to a plurality of virtual characters and/or a plurality of limit information items set by the plurality of distributors.

8. The content distribution server according to claim 7, wherein in a case where there is a limit contradicting the plurality of limits, the content distribution server preferentially applies a disapproval setting to an approval setting.

9. The content distribution server according to claim 7, wherein in a case where there is a limit contradicting the plurality of limits, the content distribution server cancels an approval setting and a disapproval setting that contradict each other.

10. A content distribution system, comprising:

a content distribution server distributing a live content, on the basis of an image in a virtual space in which a movement of a distributor is synthesized as a movement of a virtual character; and a virtual character providing server providing character information indicating the virtual character and additional information for limiting a behavior of a viewer in the distribution using the virtual character, which is added to the character information, wherein the content distribution server distributes the live content according to the image in the virtual space in which the movement of the distributor is synthesized as the movement of the virtual character, on the basis of the character information and the additional information that are acquired from the virtual character providing server, and/or limit information for limiting the behavior of the viewer in the distribution using the virtual character, which is set by the distributor, and limits a manipulation of a virtual camera by the viewer for photographing an inside of the virtual space, on the basis of photographing limit information set by the distributor and/or photographing limit information to be included in the additional information.

11. A content distribution method, comprising:

an information acquisition step of acquiring additional information for limiting a behavior of a viewer in distribution using a virtual character, which is added to the virtual character to be used by a distributor in a virtual space, and/or limit information for limiting the behavior of the viewer in the distribution using the virtual character, which is set by the distributor;

a distribution step of distributing a live content according to an image in the virtual space in which a movement of the distributor is synthesized as a movement of the virtual character; and a behavior limiting step of limiting a manipulation of a virtual camera by the viewer for photographing an inside of the virtual space, on the basis of photographing limit information set by the distributor and/or photographing limit information to be included in the additional information.

12. A non-transitory computer-readable storage medium containing instructions which are configured to:

acquire additional information for limiting a behavior of a viewer in distribution using a virtual character, which is added to the virtual character to be used by a distributor in a virtual space, and/or limit information for limiting the behavior of the viewer in the distribution using the virtual character, which is set by the distributor;

distribute a live content according to an image in the virtual space in which a movement of the distributor is synthesized as a movement of the virtual character; and limit a manipulation of a virtual camera by the viewer for photographing an inside of the virtual space, on the basis of photographing limit information set by the distributor and/or photographing limit information to be included in the additional information.

* * * * *